(12) United States Patent
Hagny

(10) Patent No.: US 6,314,897 B1
(45) Date of Patent: Nov. 13, 2001

(54) FURROW CLOSING SYSTEM AND METHOD FOR NO-TILL AGRICULTURAL SEEDERS

(76) Inventor: Matthew P. Hagny, 1701 Osborne St., Salina, KS (US) 67401

(*) Notice: Subject to any disclaimer, the term of this patent is extended or adjusted under 35 U.S.C. 154(b) by 0 days.

(21) Appl. No.: 09/432,455
(22) Filed: Nov. 2, 1999
(51) Int. Cl.$^7$ .................................................. A01C 5/06
(52) U.S. Cl. .............................. 111/192; 111/193; 111/195
(58) Field of Search ................................... 111/191, 193, 111/195, 192, 190

(56) References Cited

U.S. PATENT DOCUMENTS

| | | | |
|---|---|---|---|
| 4,213,408 | * 7/1980 | West et al. | 111/85 |
| 4,275,670 | 6/1981 | Dreyer | 111/85 |
| 4,570,554 | 2/1986 | Clark | 111/85 |
| 4,702,323 | 10/1987 | Smit et al. | 172/156 |
| 4,991,660 | 2/1991 | Horvath et al. | 172/551 |
| 5,060,585 | 10/1991 | Alexander | 111/89 |
| 5,443,023 | 8/1995 | Carroll | 111/191 |
| 5,497,717 | 3/1996 | Martin | 111/191 |
| 5,609,114 | 3/1997 | Barton | 111/167 |
| 5,619,939 | 4/1997 | Herman et al. | 111/163 |
| 5,752,454 | 5/1998 | Barton | 111/167 |
| 5,896,932 | 4/1999 | Bruns et al. | |
| 5,970,891 | * 10/1999 | Schlagel | 111/191 X |
| 6,119,608 | 9/2000 | Peterson et al. | 111/192 |

* cited by examiner

Primary Examiner—Christopher J. Novosad
(74) Attorney, Agent, or Firm—Jeffrey L. Thompson; Thompson & Thompson, P.A.

(57) ABSTRACT

An improved furrow closing system and method are disclosed for agricultural seeders, particularly no-till seeders, that produce an open furrow in the soil into which seeds are placed. The closing system includes one or more spoked wheels rotatably mounted rearward of the seed furrow opener of the seeder. The vertical angle and lateral alignment at which the spoked wheel is mounted, together with the shape and length of the spokes themselves, provide a gentle closing of the furrow by slicing instead of squeezing or wedging, a shattering of the furrow sidewall and a pushing of the fragments into the furrow. The shattering of the furrow sidewall results in a more consistent furrow closure, a more rapid and uniform seed germination and seedling emergence, a higher percentage of emergence, and an improved seedling root growth. The spoked wheel has a plurality of spokes projecting radially from the hub of the wheel. The spokes are tapered to improve their penetration into the soil, and are preferably made of polyurethane or other non-stick material to improve the shedding of mud as the wheel rotates. The spoked wheel has a vertical inclination angle of approximately 35° to 65°, and preferably about 50°, and a lateral alignment of plus or minus ⅜ inch relative to the midline of the furrow, and preferably about 0 inch. The spoked wheel also has a toe-out angle in the range of 0° to 8°, and preferably about 3.5°.

20 Claims, 5 Drawing Sheets

FURROW CLOSING SYSTEM AND METHOD FOR NO-TILL AGRICULTURAL SEEDERS

BACKGROUND OF THE INVENTION

1. Field of the Invention

The present invention relates generally to agricultural seeders that produce open furrows in the soil into which seeds are placed, and more particularly to an improved furrow closing system that provides a gentle and consistent closing of furrows in no-till seeding conditions.

2. Description of the Prior Art

Agricultural planting methods continue to improve in response to rapid worldwide adoption of no-till crop production techniques, in which the new crop's seeds are placed directly into the previous crop's stover, also known as stubble or crop residues. No-till seeding differs greatly from seeding into a tilled seedbed. The soil conditions for no-till seeding are typically wetter than those dried by tillage, due to the mulching effect of the crop residue remaining on the soil surface. Wetter soils are more prone to compaction by implements traveling over or engaging the soil. No-till soils are also typically more structurally stable than tilled soils, as the soil particles are "aggregated" or held together by old roots, fungi, and other organic material binding the particles together. Agricultural seeders operating in no-till conditions are often equipped and adjusted to employ more down pressure, either via coil spring or hydraulics, on the furrow opening disc to aid in the slicing of old crop residues and to assist in the penetration of this more structured soil. The extra down pressure on the opener disc and depth-gauging wheel sometimes results in more compaction of the furrow sidewall.

Especially in no-till, some difficulties are encountered when attempting to draw soil back into the furrow, which is desirable to protect the newly placed seeds from drying winds and sun, to protect from predation, and to improve seedling uniformity of growth. In tilled soils, the prior art was to employ packing wheels rearward of the furrow openers. The packing wheels operated to both close the furrow and to do some amount of packing, since in the loose and dry tilled soils packing is desirable to assist the seed in drawing moisture from below the seed. In no-till seeding, the wetter and more structured soils prevent packing wheels from performing adequately. The sidewall of the furrow formed in no-till seeding does not crumble easily like the sidewall in the tilled conditions, where the soil had previously been loosened and fluffed by tillage. Accordingly, very high pressures are sometimes employed on the packing or closing wheels in an attempt to squeeze the furrow sidewalls back together. This typically results in poor seedling emergence because the seedling has great difficulty pushing itself through this dense layer of soil.

Some improvements have been made by separating the seed firming and fir row closing functions. This is typically only possible where the depth-gauging function is already accomplished independently of the packing or closing wheel, as in the configuration where depth-gauging wheels travel alongside the furrow opening discs. Seeds are firmed into the soil in the bottom of the furrow by a narrow rolling wheel or sliding-type firmer exerting a slight amount of pressure onto the seed after it has been placed by the furrow openers and seed-directing tube. Since the closing wheel is now relieved of its packing function, the closing wheel may comprise a cast iron wheel with a sharp beveled edge or a spoked or tined wheel. Several spoked closing wheel types have been invented, as shown, for example, in U.S. Pat. No. 5,443,023 issued to Carroll, U.S. Pat. No. 5,497,717 issued to Martin, and U.S. Pat. No. 5,896,932 issued to Bruns et al. These spoked closing wheels all operate at angles and alignments inherited from conventional equipment designed to function in tilled seedbeds, and are not particularly suitable for either the spoked design or no-till seeding conditions. The results vary depending on the exact spoked wheel employed and the soil conditions, but generally the closing is characterized by a squeezing or packing action, the furrow is not adequately covered, the sidewall is not adequately shattered, and/or the seed placement is disrupted either by the spokes themselves or by the lifting of the sidewall during the shattering event and the spoke exit.

In the current state of agricultural seeder manufacturing and usage, some dichotomy has arisen between "planters" and "grain drills" (or simply "drills"). The dichotomy is not particularly relevant to this application, except in the ease of describing the prior art. For clarity, the term "planter" commonly refers to a seeder with the capability of singulating seeds for each opener unit's placement, and typically has a relatively wide spacing between individual opener units ("opener unit" refers to the entire seed placement apparatus for one furrow, including not only the furrow opening device, but also seed-directing tube, gauge wheel, firming and closing devices, linkages, and so forth). Planters almost universally utilize two furrow-opening discs on each opener unit, mounted immediately adjacent to each other and in contact with each other at their lower leading edge, but slightly away from each other toward their upper and rearward edges, which allows for a seed-directing tube between them. Planters employ depth-gauging wheels on the outside of each disc. Planters typically have a vertically pivoting bracket mounted rearward of the opening discs. The bracket holds the closing wheels inclined at approximately 20° from the vertical and 0° from the direction of travel.

The term "grain drill" commonly refers to a seeder lacking the capability of seed singulation; instead the seed is metered volumetrically. Drills tend to have the opener units mounted to achieve narrow row spacing, although the openers may be mounted in a staggered pattern on two or more ranks. Drills are manufactured employing a wide variety of furrow openers, including non-rolling openers referred to as "hoe," "knife" or "sweep" depending on the shape of the sliding component used, and both single- and double-disc openers. Of particular relevance to this application are disc-opener drills employing depth-gauging independent of the closing or firming mechanisms. Such drills are readily adapted to use the furrow closing system described by this application.

One popular drill employing separate depth gauging and furrow closing is manufactured by Deere and Company, of Moline, Ill., and sold as the Model No. 750 and its derivatives, the 752, 1850, 1860, and 1560. The 750-style opener unit has closing wheels inclined at 20° to 24° from the vertical and approximately 8° from the direction of travel. Lateral alignment of such closing wheels is adjustable within a narrow range, usually maintaining the wheel approximately ¾ inch from the lip of the furrow or about 1 ⅛ inch from the midpoint of the furrow. Another popular drill employing separate depth gauging and finning/closing functions is the Flexicoil Model F/SO opener marketed on a variety of toolbars. The F/SO combines the firming and closing functions in one solid rubber wheel adjustable in a small range of vertical and horizontal angles, approximately from 0° to 10° from the vertical and 0° to 10° from the direction of travel.

SUMMARY OF THE INVENTION

The present invention, which has been constructed and field tested, provides a solution to the agronomic problems of furrow closure in no-till seeding, as previously discussed. By utilizing a spoked closing wheel with a certain shape and depth of spoke and configuring the mounting so that the wheel achieves furrow closure by slicing the sidewall of the furrow, rather than by squeezing, the furrow is closed in a more consistent and agronomically acceptable manner. The more gentle and uniform closure results in improvements in percentages of seedlings emerging, more uniform temporal emergence, more rapid emergence, and improvements in seedling root development.

The applicant's invention utilizes a spoked closing wheel, preferably with spokes that are tapered, non-curved, comprised of non-stick materials, and approximately 2 inches in length, although other configurations may ultimately prove useful also. The key to performance is the mounting of the wheel so that the spokes are inclined from the vertical by approximately 50° plus or minus 15° when they pass through the sidewall of the furrow. The wheel is also preferably tilted from the direction of travel ("toe-out") in the range of approximately 0° to 8° and preferably about 3.5°. The lateral alignment is now 0 inch plus or minus 3/8 inch, i.e., the outer tips of the spokes at the point in the path of their rotation closest to the furrow meet a hypothetical vertical plane passing through the midline of the furrow.

The applicant's invention causes the tips of the spokes to engage the soil at a slight distance laterally from the furrow. The weight of the bracket and spoked closing wheel, together with any downforce supplied by spring tension onto the closing wheel mounting bracket, together with the slight toe-out of the closing wheel and the sharpness of its spokes, causes each spoke to slice or push through the soil comprising the sidewall of the furrow. The spoke typically slices or pushes entirely through the sidewall and into the furrow itself, carrying with it the fragmented sidewall. The depth of operation is self-limiting by the length of the spokes and their proximity to one another. Once the area between the spokes fills with fragmented soil, the closing wheel tends not to go any deeper. The depth is also limited by the structure of the no-till soil itself, the low weight and pressure exerted on the spokes of the wheel, the tapering of the spokes, and the blunt tip of each spoke. Accordingly, the wheel lacks the ability to penetrate below the area the disc opener has sliced. This is important since deeper penetration would disrupt seed placement. If the current invention does penetrate to the depth of the seed, it merely supplies additional seed-to-soil firming, since the shape of the spoke and its angle of operation prevent it from lifting seeds from the furrow bottom into which they have been firmed by the firming mechanism.

The applicant's invention may be configured with either one or two closing wheels per furrow, depending the configuration of the opener discs, the crop seeded, and the soil conditions. Due to the importance of the angles at which the spoked wheel is mounted and in which the spokes operate, it may be desirable to include a parallel linkage in the mounting to maintain the precise angles throughout the range of vertical travel the opener and closing wheel will encounter during field operation.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the is invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

Furrow closing systems for no-till agricultural seeders according to preferred embodiments of the present invention will now be described in detail by reference to FIGS. 1 to 9 of the accompanying drawings.

Figure 1:
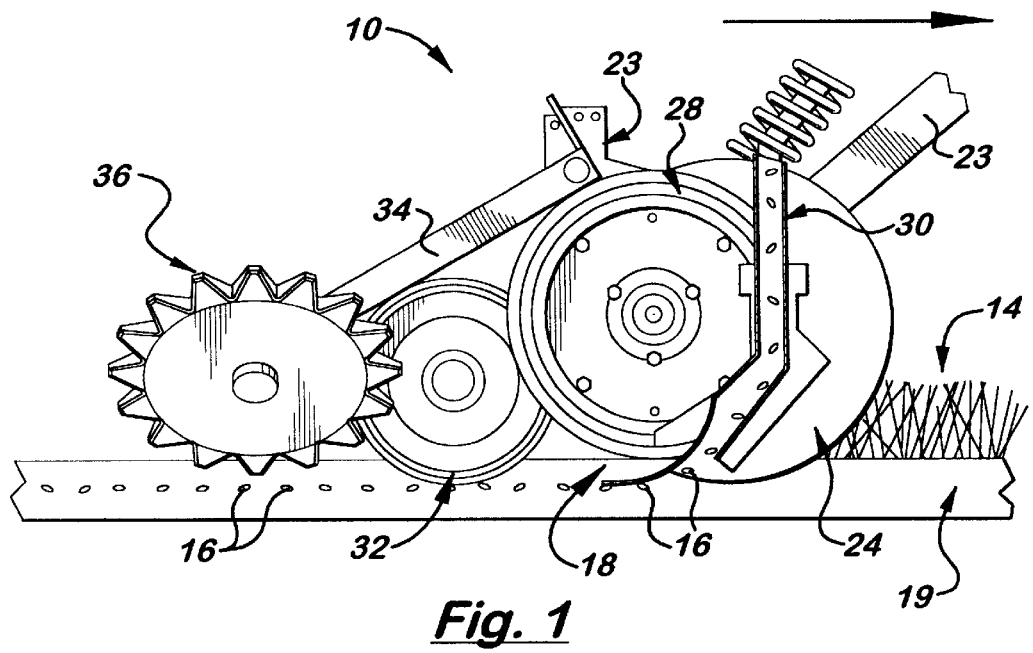
FIG. 1 is a side view of a no-till drill opener unit utilizing a single-disc design with adjacent depth-gauging wheel, and separate firming wheel and spoked closing wheel.

FIG. 1 is a side view of a common no-till drill opener unit 10, which has the ability to adequately place seeds in a soil 19 that has not been plowed or disced or otherwise tilled to loosen the soil and bury old crop residues 14 also referred to as stover. This opener unit 10 is attached to the remaining components of the drill by way of a control arm 23 and coil spring for supplying down pressure to penetrate the soil. Other methods of attaching the opener unit 10 will be obvious to those skilled in the art. The no-till opener unit 10 comprises a sharp-edged rotating opener disc 24, also known as a coulter or blade, operating at a slight angle to the direction of travel to pry open a furrow 18 in the soil 19 into which seeds 16 are dropped from a seed-directing mechanism, typically in the form of a tube 30. The depth of the furrow is controlled by a depth-gauging wheel 28 operating in the same plane as the opener disc 24 and immediately adjacent to the disc, although slightly rearward. The seed-directing tube 30 is typically located on the side of the opener disc 24 opposite the depth-gauging wheel 28. Immediately rearward of the seed-directing tube 30 is a firming wheel 32 or other device for pushing the seeds into the soil at the bottom of the furrow 18. The firming wheel 32 is mounted to pivot vertically independent of the opener disc 24 and depth-gauging wheel 28. This permits effective operation even as the contour of the soil 19 varies.

Immediately rearward of the firming wheel 32 is a closing wheel 36, shown here as a spoked wheel. The closing wheel 36 is mounted to pivot vertically on a support member, such as a closing wheel arm 34. The vertical movement of the closing wheel 36 is independent of the opener disc 24 and depth-gauging wheel 28 and also independent of the firming wheel 32. The closing wheel arm 34 attaches to the closing wheel 36 by way of a rotatable bearing (not shown), the mounting of which causes the spoked closing wheel 36 to operate at a particular angle and alignment which will be explained in detail below with reference to FIG. 5.

Figure 2:
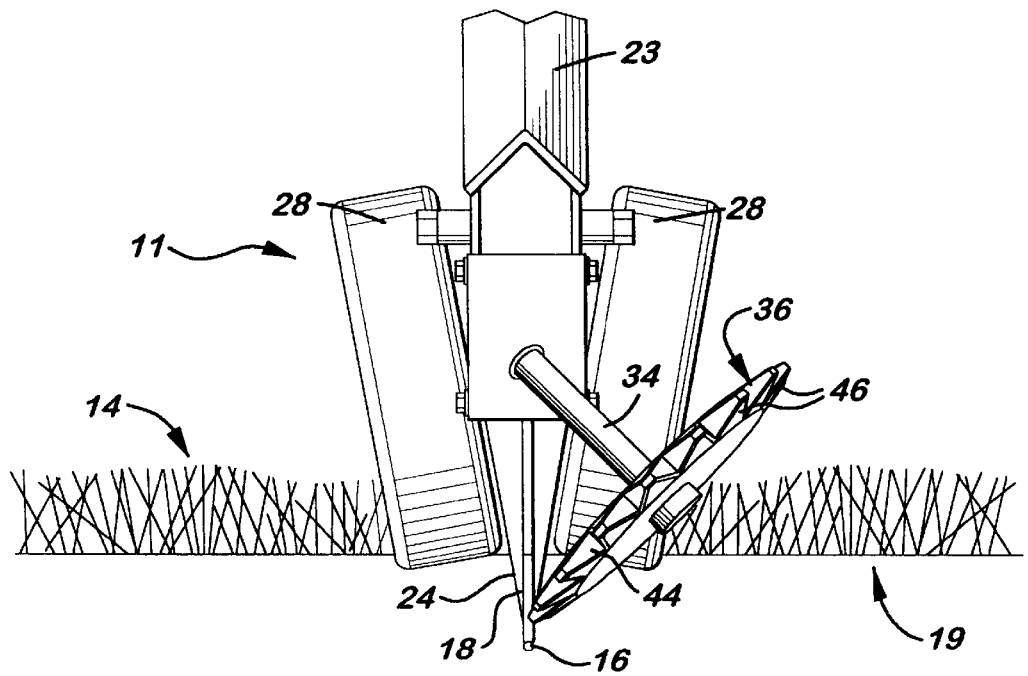
FIG. 2 is a rear view of a planter with the spoked closing wheel mounted according to the present invention.

FIG. 2 is a rear view of a common planter opener unit 11 (the planter is moving away from the viewer), together with a cross section of the soil 19. As with the no-till drill opener unit 10, the planter opener unit 11 is attached to the remainder of the planter by means of a subframe 23 and linkages (not shown) and springs or other devices for supplying down pressure to penetrate the old crop residues 14 and soil 19. The rotating opener discs 24 operate together to form a furrow 18. The discs 24 are mounted to operate in contact with each other on the lower leading edge, and slightly apart toward the upper and rearward edges. A seed-directing tube (not shown) is located between the discs 24. A depth-gauging wheel 28 is located immediately adjacent to, and operates in the same plane as, each opening disc 24. The opener discs 24 and depth-gauging wheels 28 of the planter opener unit 11 operate in the same manner as the no-till drill opener unit 10, creating a well-defined furrow 18 into which seeds 16 are placed by the seed-directing tube. As with the drill opener unit 10, in no-till conditions it would be desirable to mount a firming wheel or other firming device so that the seeds 16 are positively pushed into the soil 19 at the bottom of the furrow 18 by the planter opener unit 11, although many planters have been manufactured without such firming devices.

Rearward of the firming device, the closing wheel 36 is mounted from a bracket 34 which has the ability to pivot vertically about a single point located on the subframe of the opener unit 11 immediately rearward of the opener discs 24. In another preferred embodiment (described below with reference to FIG. 9), the closing wheel bracket 34 is mounted on a "parallel" linkage with four pivoting points, two on the subframe and two on the bracket 34, which allows vertical pivoting with the added benefit that the bracket 34 does not change pitch throughout its range of travel. Maintaining the angle of the bracket 34 in relation to the soil surface has the benefit of maintaining the closing wheels 36 at their optimum angles, which would not occur if the pitch of the bracket 34 changes during its arc of vertical travel. The closing wheel spokes 46, 44 and their shape and method of engaging the soil 19 will be further discussed.

Figure 3:
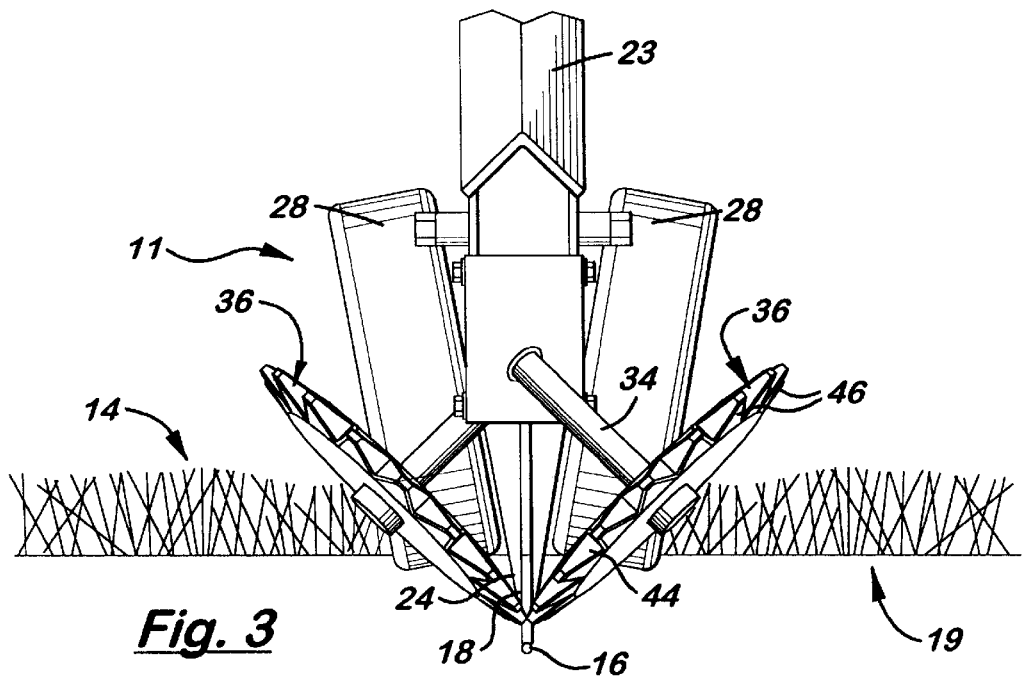
FIG. 3 is a rear view of a planter with two spoked closing wheels mounted according to the present invention.

FIG. 3 shows the same view of a planter opener unit as FIG. 2, but with two spoked closing wheels 36. For residue and mud clearance, field testing has shown that the spoked closing wheels 36 must be located in a staggered pattern, that is, one ahead of the other, and some distance apart. Field testing has generally shown that one closing wheel 36 is adequate, especially when operated on a parallel linkage. On single-disc opener units such as is commonly used on no-till drills, one spoked closing wheel 36 of the configuration and mounting arrangement embodying the invention is highly consistent in closing the furrow 18. On double-disc opener units, the soil 19 is pried in two directions to form the furrow 18. To replace all of the soil 19 to its approximate pre-planted location requires two spoked closing wheels 36 shattering both sidewalls of the furrow 18. However, field testing has shown that one spoked closing wheel 36 of the configuration and mounting arrangement embodying the present invention will consistently cover the seed 16 in a very desirable agronomic condition, although not completely filling the furrow 18.

Figure 4:
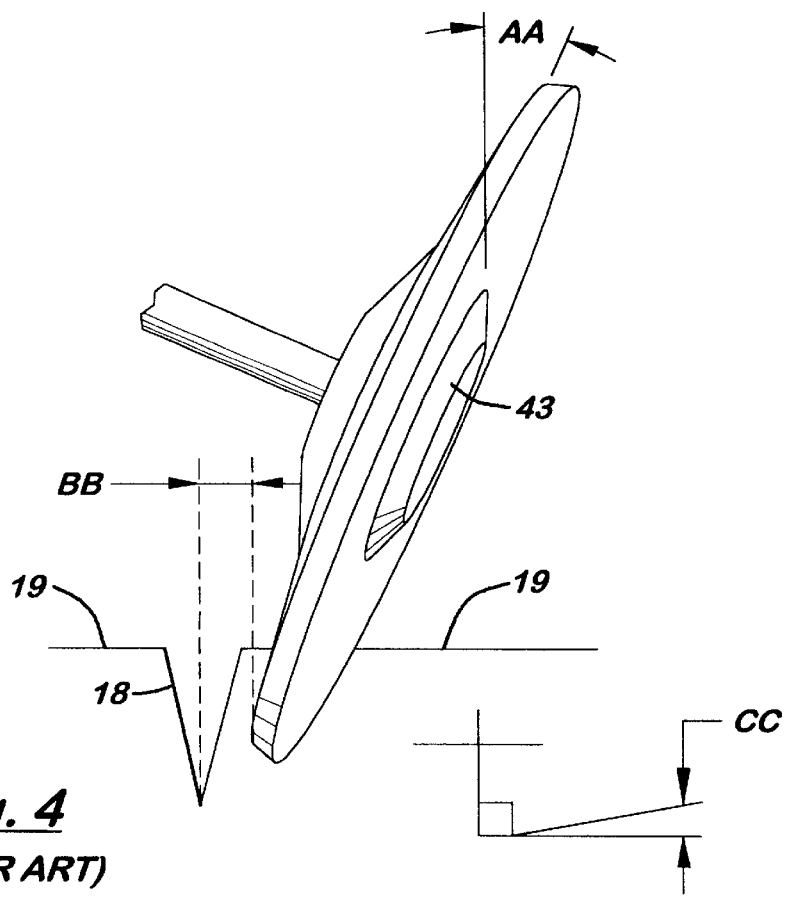
FIG. 4 is a rear cross-sectional view of the furrow and prior art closing wheel.

FIG. 4 depicts a cross-section of a prior art closing wheel 43, together with the soil 19 and furrow 18 viewed in cross section along the direction of travel. The prior art often used solid (non-spoked) closing wheels 43 of cast-iron or with a hollow rubber ring fitted along the edge, but sometimes spoked wheels of various designs were employed. The angle AA refers to inclination from the vertical ("camber" in the automotive industry), and in the prior art was nearly universal in the range of 20° to 24° for planter manufacturers and John Deere 750-type drills. This angle value has long been considered by those skilled in the art to be the optimum angle for planters and drills operating in looser and drier tilled conditions where firming was desirable. The majority of the pressure exerted by the prior art closing wheels 43 is beside and below the seed, with the seed in the penumbra and very little packing above the seed. The advent of various spoked wheels that were mounted at this same angle tended to perform some breaking or perforation of the sidewall of the furrow, which was produced by a wedging-type action, which caused additional packing of the sidewall, incomplete breaking of the sidewall, incomplete covering of the furrow, and possible disruption of seed placement.

In FIG. 4, the dimension BB refers to lateral alignment, which is the distance between the furrow midpoint and the edge of the wheel or spoke at its closest point in its rotation. The prior art typically used a dimension of 1.25 inch lateral alignment, although some prior art arrangements have been disclosed for varying this limitation on planters. For example, U.S. Pat. No. 4,570,554 issued to Clark describes an apparatus for varying the lateral alignment dimension on planters.

The angle CC is not clearly shown in FIG. 4, but refers to the wheel's departure from the true direction of travel with the leading edge being farther from the furrow than the trailing edge ("toe-out" to the automotive industry). Most planters are manufactured with 0° for this angle and do not make provision for changing this angle. The John Deere 750-style drill is manufactured with a closing wheel operating at a toe-out angle of approximately 8° from the direction of travel.

Figure 5:
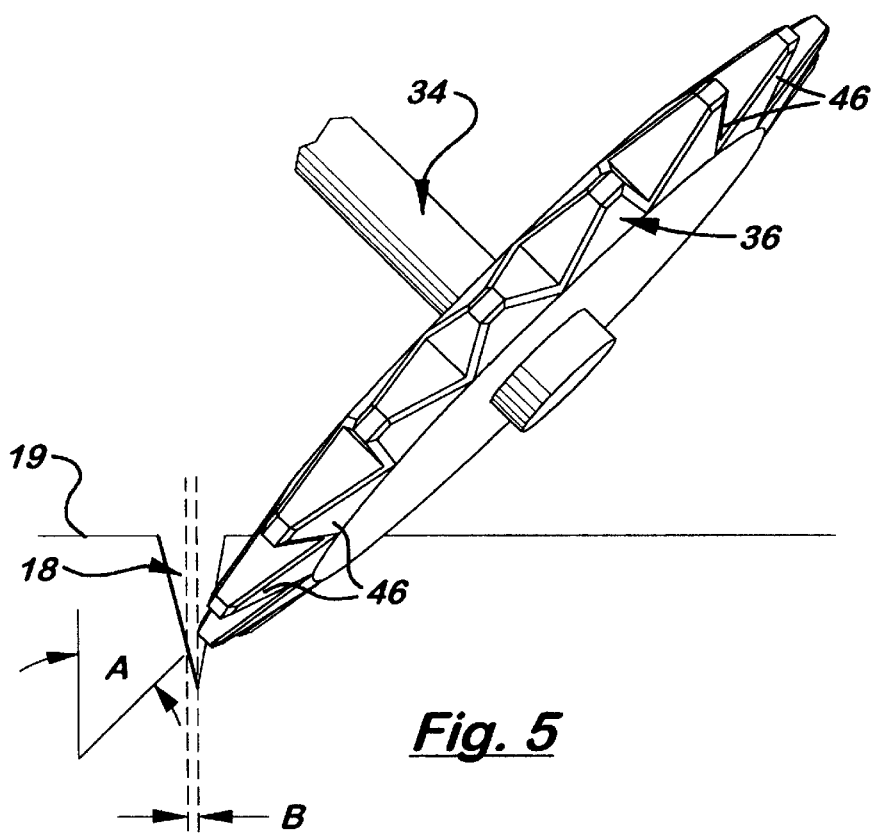
FIG. 5 is rear cross-sectional view of the furrow and closing wheel arrangement according to the present invention.

FIG. 5 depicts a cross-section of the preferred embodiment of the invention, in the same relation to the soil and furrow as prior art FIG. 4. The spokes 46 of the spoked closing wheel 36 project radially outwardly from a hub mounted for rotation on the arm 34. The spokes 46 possess certain dimensions and characteristics which will be described below. The vertical inclination angle A or camber of the spoked closing wheel 36 is substantially larger than the vertical inclination angle AA shown in prior art FIG. 4. The vertical inclination angle A is within the range of 35° to 65°, and is preferably about 50°, to create the slicing and pushing action of the spokes 46 contemplated by the present invention.

The lateral alignment B has been substantially decreased as compared to the lateral alignment BB shown in prior art FIG. 4. The lateral alignment B is plus or minus ⅜ inch, and is preferably about 0 inch, meaning that the outer tips of the spokes 46 of the closing wheel 36 at a point in their path of rotation closest to the furrow meet a vertical plane passing through the furrow midpoint and extending along the direction of travel.

Figure 6:
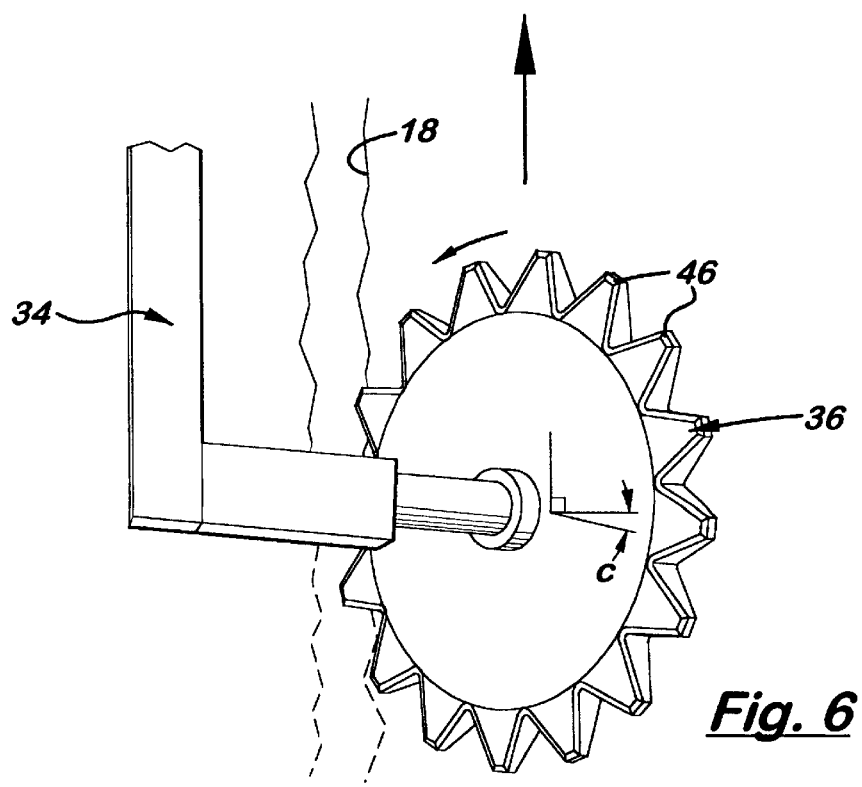
FIG. 6 is a top plan view of the spoked closing wheel arrangement according to the present invention.

FIG. 6 depicts the closing wheel 36 from directly above, showing the small toeout angle C and the slicing and pushing action exerted by the closing wheel 36 on the shattered sidewall of the furrow 18.

Figure 7:
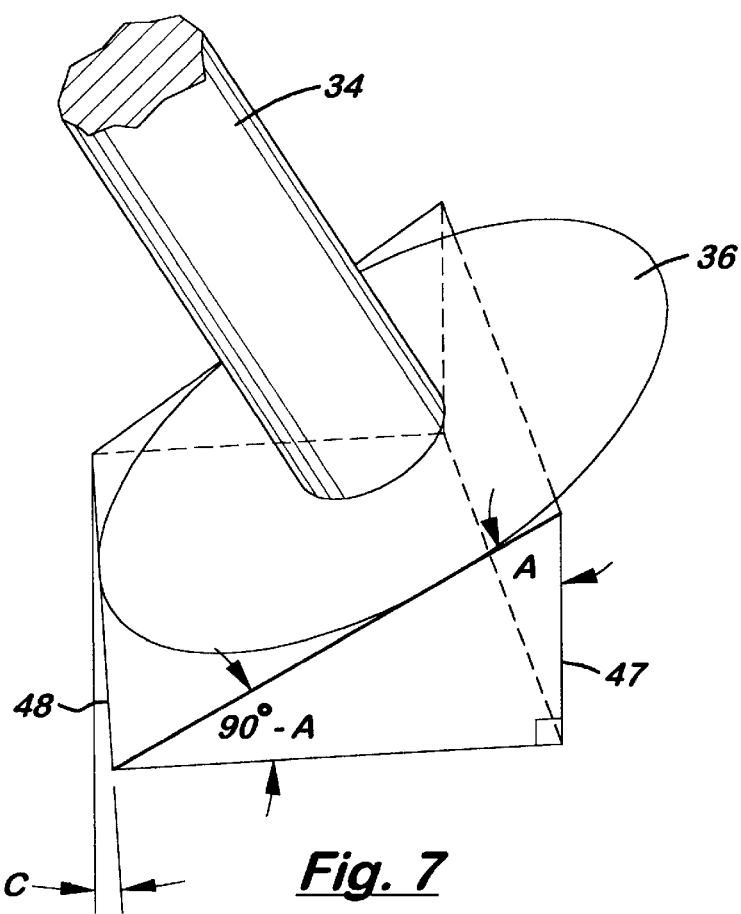
FIG. 7 is a diagram of the closing wheel arrangement with a wedge-shaped block abutted against a face of the wheel to further illustrate the calculation of the vertical inclination angle and the toe-out angle.

FIG. 7 illustrates in more detail the vertical inclination angle A and the toe-out angle C of the spoked closing wheel 36 of the present invention. As shown in FIG. 7, the toe-out angle C can be measured by placing a wedge-shaped block 47 having an angle corresponding to the vertical inclination angle A against the face of the wheel 36, and then measuring the angle C formed between the lower edge 48 of the block 47 and the direction of travel. This angle C is the toe-out angle.

The toe-out angle C is within the range of 0° to 8°, and is preferably about 3.5°, although this angle C is of minor importance once the vertical inclination angle A is dramatically increased, together with the alignment and spoke characteristics which will be described in detail below. The large vertical inclination angle A permits the spokes 46 of the wheel 36 to enter the soil more readily, which results in the need for only a very slight toe-out angle C to assist the spokes 46 in entering the soil 19.

Figure 8:
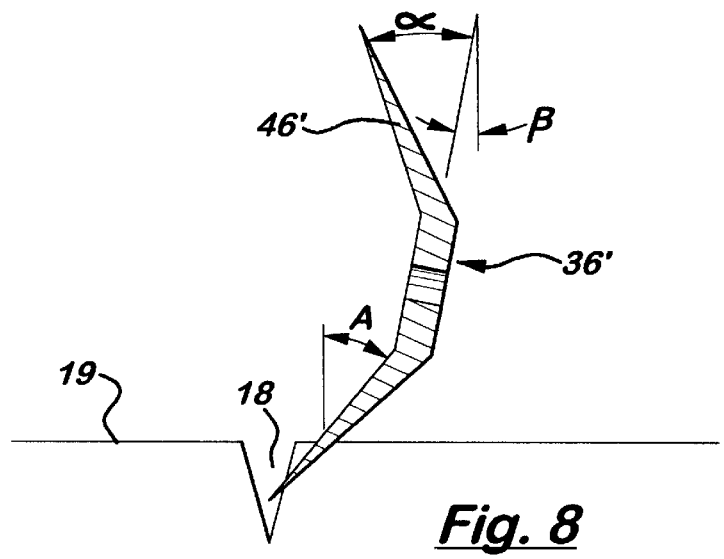
FIG. 8 is a cross sectional view of a spoked closing wheel having spokes that extend at an angle from the hub.

FIG. 8 illustrates a variation of the spoked closing wheel 36' in which the spokes 46' extend at an angle α from the hub of the wheel, thereby creating a concave wheel. In this variation of the Applicant's invention, the hub could operate at a smaller vertical angle β (e.g., 20°), while the spokes are operating at a 50° vertical inclination angle A as they pass through the side wall of the furrow 18.

The crucial characteristics of the applicant's invention are generally the angles and position at which the spoked closing wheel operates, and more specifically, the angle and path of travel of the spokes 46 as they rotate through the soil 19, together with the shape of the spokes 46 themselves. The applicant's closing wheel system is based on the novel concept of closing the furrow by slicing and pushing the shattered sidewall of the furrow 18, rather than the prior art's squeezing or wedging action. As the closing wheel 36 rotates, each spoke 46 first contacts the soil surface some distance from the lip of the furrow 18, usually about 1 inch to 1.5 inch distant. As the spoke 46 continues its path downward and rearward, the spoke 46 cleaves the sidewall of the furrow 18 neatly due to the smallish area of the spoke's blunt tip, such area being approximately 0.25 inch square. Because of the small flat spot on the tip, and also the tapering of the spoke 46 itself, the spoke 46 tends to push the fragmented sidewall into the furrow 18.

Due to the low weight and down pressure exerted on the closing wheel 36 and its spokes 46, the relatively slight angle of toe-out, the slightly blunt spoke tips, the tapering and proximity of the spokes to each other, and the length of the spokes, the spokes 46 have difficulty entering a structured no-till soil except where a furrow exists nearby, i.e., the spokes 46 are only aggressive enough to slice through the corner created between the furrow 18 and the soil surface. This is important because the closing wheel 36 lacks the ability to dig below the bottom of the furrow, which would disrupt the seed placement and the firming already accomplished by other components of the seeder opener. Should the spoke 46 of this particular embodiment of the invention penetrate to (but not below) the bottom of the furrow, the spoke generally merely supplies additional firming of the seed into the soil, since the blunt tip of the spoke is still pushing soil downward and inward, even as some of the sidewall has already shattered and pushed past the tip. The result is that, at the moment the spoke tip breaks into the furrow, it is pushing soil toward the seed. This prevents the side of the spoke 46 from lifting any seeds out of the furrow 18 as the spoke exits. A spoke of a longer, or sharper, or non-tapered design would tend to do more lifting of the seed and soil.

Figure 9:
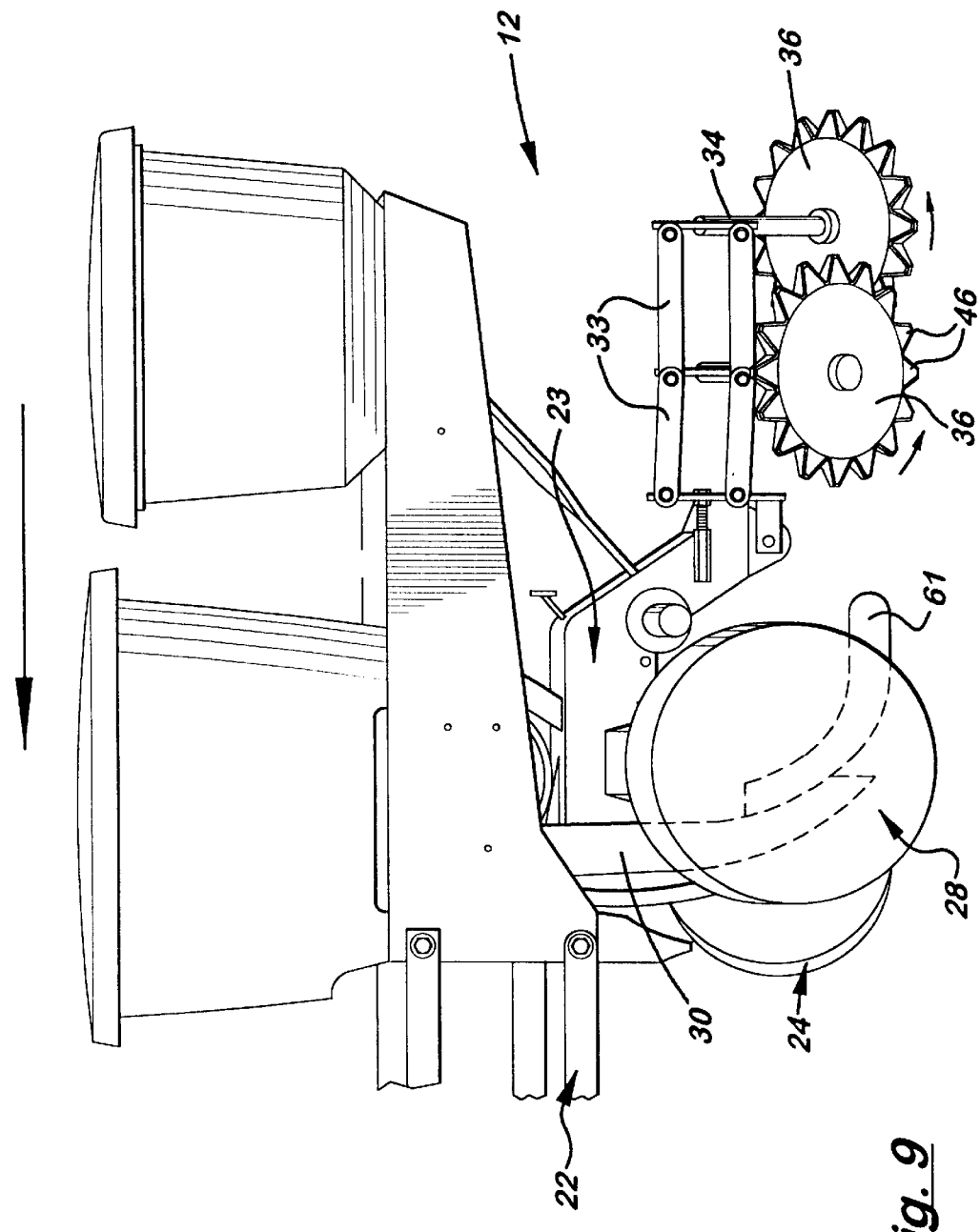
FIG. 9 is a side elevational view of a planter unit utilizing a pair of spoked closing wheels supported by a parallel linkage according to the present invention.

FIG. 9 shows a side elevational view of another planter opener unit 12, with most components previously described. This view shows a sliding seed firming device 61 and two spoked closing wheels 36. The view also shows the opener unit subframe 23 and parallel linkages 22 for attaching the opener unit subframe 23 to the primary toolbar (not shown) of the planter. The closing wheel bracket 34 is mounted on a "parallel" linkage 33 with four pivoting points, two on the subframe 23 and two on the bracket 34. The parallel linkage 33 allows vertical movement of the closing wheels 36 relative to the other components of the planter opener unit 12, while keeping the horizontal pitch of the bracket 34 constant throughout its range of travel. By maintaining a constant angle of the bracket 34 relative to the soil surface, the closing wheels 36 are maintained at their optimum angles during operation. The parallel linkage 33 for mounting the rear closing wheel 36 can be attached either directly to the subframe 23 or to the rear of the bracket 34 for the front closing wheel 36.

It will be appreciated that the present invention is not limited to the exact constructions that have been described above and illustrated in the accompanying drawings, and that various modifications and changes can be made without departing from the scope and spirit of the invention. It is intended that the scope of the invention be limited only by the appended claims.

What is claimed is:

1. An agricultural seeder, comprising:
   a furrow opener adapted to create a furrow in a soil surface;
   a seed directing mechanism adapted to direct seed into the furrow; and
   a closing assembly adapted to close the furrow over the seed, said closing assembly comprising at least one spoked wheel having a hub and a plurality of spokes projecting outwardly from the hub, said spoked wheel being rotatably supported by a support member such that said spokes have a vertical inclination angle within a range of 35° to 65° as the spokes push through and shatter a side wall of the furrow.

2. The agricultural seeder according to claim 1, wherein said vertical inclination angle of said spokes is about 50°.

3. The agricultural seeder according to claim 1, wherein outer tips of the spokes of said spoked wheel have a path of rotation, and said support member supports said spoked wheel such that a point on said path of rotation closest to the furrow is within ⅜ inch of a midline of the furrow.

4. The agricultural seeder according to claim 3, wherein said point on said path of rotation is approximately aligned with said midline of the furrow.

5. The agricultural seeder according to claim 1, wherein said support member supports said spoked wheel so as to have a toe-out angle relative to a direction of travel within a range of 0° to 8°.

6. The agricultural seeder according to claim 5, wherein said toe-out angle is approximately 3.5°.

7. The agricultural seeder according to claim 1, wherein outer tips of the spokes of said spoked wheel have a path of rotation, and said support member supports said spoked wheel such that a point on said path of rotation closest to the furrow is within ⅜ inch of a midline of the furrow, and a toe-out angle relative to said direction of travel is within a range of 0° to 8°.

8. The agricultural seeder according to claim 7, wherein said vertical inclination angle of said spokes is about 50°, said point on said path of rotation is approximately aligned with said midline of the furrow, and said toe-out angle is approximately 3.5°.

9. The agricultural seeder according to claim 1, wherein said spokes are generally straight and tapered to a smaller dimension in a radially outward direction from said hub, said spokes having blunt outer tips.

10. The agricultural seeder according to claim 1, further comprising a depth gauge wheel assembly associated with said furrow opener and adapted to contact a top surface of the soil to control and determine a depth of the furrow.

11. The agricultural seeder according to claim 1, further comprising a firming assembly arranged between the seed directing mechanism and the closing assembly and adapted to press seed into a bottom portion of the furrow.

12. The agricultural seeder according to claim 1, wherein said closing assembly is supported by a parallel linkage that allows vertical movement of the closing assembly without changing the toe-out and vertical inclination angles of said spoked wheel.

13. The agricultural seeder according to claim 1, wherein said at least one spoked wheel comprises first and second spoked wheels positioned on opposite sides of the furrow, said spoked wheels each have spokes that extend at a vertical inclination angle within a range of 35° to 65° as the spokes pass through respective side walls of the furrow, outer tips of the spokes of said first and second spoked wheels have respective first and second paths of rotation, a point on each path of rotation closest to the furrow is within 3/8 inch of a midline of the furrow, and a toe-out angle relative to a direction of travel for each spoked wheel is within a range of 0° to 8°.

14. A closing wheel assembly adapted to be used on an agricultural seeder to close a furrow by slicing and shattering a sidewall of the furrow after seed is directed into the furrow, comprising:

a closing wheel support; and a spoked closing wheel having a hub and a plurality of spokes with outer tips projecting radially outwardly from the hub, said outer tips of said spokes having a path of rotation that lies in a first plane, said spoked closing wheel being rotatably mounted on said closing wheel support such that said spokes are inclined at an angle from vertical that is within a range of 35° to 65° as the spokes pass through the sidewall of the furrow.

15. The closing wheel assembly according to claim 14, wherein a point on said path of rotation closest to said furrow is within 3/8 inch of a midline of the furrow.

16. The closing wheel assembly according to claim 14, wherein said spoked closing wheel has a toe-out angle relative to a direction of travel within a range of 0° to 8°.

17. The closing wheel assembly according to claim 14, wherein said spokes are generally straight and tapered to a smaller dimension in a radially outward direction from said hub, said outer tips of said spokes being blunt.

18. A method of closing a furrow formed by an agricultural seeder after seed is directed into the furrow, comprising the steps of:

providing a first spoked closing wheel having an axis of rotation and a plurality of spokes with blunt outer tips projecting radially outwardly from the axis; and positioning said first spoked closing wheel adjacent to a furrow containing seeds and at an angle from vertical such that the blunt outer tips of the spokes push through and shatter a sidewall of the furrow as the first spoked closing wheel is moved in a direction of travel along the furrow.

19. The method according to claim 18, wherein said positioning step comprises positioning said first spoked closing wheel such that the spokes are inclined at an angle from vertical within a range of 35° to 65° as the spokes pass through a sidewall of the furrow, and such that a point on a path of rotation of the outer tips of the spokes closest to the furrow is within 3/8 inch of a midline of the furrow.

20. The method according to claim 18, further comprising the steps of: providing a second spoked closing wheel having an axis of rotation and a plurality of spokes with blunt outer tips projecting radially outwardly from the axis; and positioning said second spoked closing wheel on an opposite side of the furrow containing seeds from the first spoked closing wheel and at an angle from vertical such that the blunt outer tips of the spokes of the second closing wheel push through and shatter a second sidewall of the furrow as the second closing wheel moves in a direction of travel along the furrow.

* * * * *